United States Patent
Broto et al.

(10) Patent No.: US 7,768,870 B2
(45) Date of Patent: Aug. 3, 2010

(54) METHOD FOR ADJUSTING A SEISMIC WAVE VELOCITY MODEL ACCORDING TO INFORMATION RECORDED IN WELLS

(75) Inventors: Karine Broto, Rueil-Malmaison (FR); Héry Rakotoarisoa, Villepreux (FR)

(73) Assignee: Institut Francais du Petrole, Cedex (FR)

( * ) Notice: Subject to any disclaimer, the term of this patent is extended or adjusted under 35 U.S.C. 154(b) by 0 days.

(21) Appl. No.: 12/146,868

(22) Filed: Jun. 26, 2008

(65) Prior Publication Data
US 2009/0010102 A1 Jan. 8, 2009

(51) Int. Cl.
*G01V 1/00* (2006.01)
(52) U.S. Cl. .................................. 367/25
(58) Field of Classification Search ............ 367/38, 367/50–53, 56, 25–35
See application file for complete search history.

(56) References Cited

U.S. PATENT DOCUMENTS

| 5,696,735 | A  | * | 12/1997 | Krebs ............... 367/50 |
| 5,812,493 | A  |   | 9/1998  | Robein et al. |
| 7,065,004 | B2 | * | 6/2006  | Jiao et al. ............. 367/51 |
| 2006/0256657 | A1 | * | 11/2006 | Robinson ............. 367/38 |
| 2008/0273421 | A1 | * | 11/2008 | Koren et al. .......... 367/11 |
| 2008/0288226 | A1 | * | 11/2008 | Gurpinar et al. ........ 703/10 |

FOREIGN PATENT DOCUMENTS

EP 0 756 181 A 1/1997

OTHER PUBLICATIONS

Stewart, "Depth Imaging of Reservoirs Using Well logs, VSP and Surface Seismic Data," ASEG/SEG Conference, 1988.*

Chiu et al, "Tomographic Determination of Three-Dimensional Seismic Velocity Structure Using Well Logs, Vertical Seismic Profiles, and Surface Seismic Data", Geophysics, Society of Exploration Geophysicists, Tulsa, OK, US, vol. 52, No. 8, Aug. 1987 (1987-08), pp. 1085-1098, XP002088679 ISSN: 0016-8033.

Bishop, T.N., et al: "Tomographic Determination of Velocity and Depth in Laterally Varying Media", Geophysics, Society of Exploration Geophysicists, Tulsa, OK, US, vol. 50, No. 6, 1985, pp. 903-923, XP002196294, ISSN: 0016-8033.

* cited by examiner

*Primary Examiner*—Scott A Hughes
*Assistant Examiner*—Krystine Breier
(74) *Attorney, Agent, or Firm*—Antonelli, Terry, Stout & Kraus, LLP.

(57) ABSTRACT

The invention is a method for defining the development conditions of a hydrocarbon reservoir by updating a velocity model by means of log data. A first seismic depth image representative of the reservoir is established by using seismic data and a velocity model. A series of log data is acquired from wells. Differences between seismic reflector depths observed in the first seismic depth image and depths for these reflectors identified in the wells are measured. The velocity model is modified to minimize these errors, using a prestack kinematic inversion technique allowing constraints to be taken into account. A new seismic depth image from which the development conditions of the hydrocarbon reservoir are determined is deduced therefrom. The invention has application for hydrocarbon reservoir development.

16 Claims, 4 Drawing Sheets

METHOD FOR ADJUSTING A SEISMIC WAVE VELOCITY MODEL ACCORDING TO INFORMATION RECORDED IN WELLS

BACKGROUND OF THE INVENTION

1. Field of the Invention

The present invention relates to the field of development of an underground reservoir such as a hydrocarbon reservoir. In particular, the invention concerns the geometrical characterization of such reservoirs.

The petroleum industry, and more precisely petroleum reservoir exploration and development, requires knowledge of the underground as perfect as possible to efficiently provide evaluation of reserves, production modelling or development management. In fact, determining the location of a production well or of an injection well, the necessary parameters for optimum hydrocarbon recovery, such as injection pressure, drilling mud composition, completion characteristics, require good knowledge of the reservoir geometry.

The petroleum industry has combined for a long time technical measurements with modelling performed in the laboratory and/or by softwares. Petroleum reservoir modelling thus is an essential technical stage of reservoir exploration or development. The goal of modelling is to provide a description of the reservoir via its geometry, its sedimentary architecture or its petrophysical properties.

2. Description of the Prior Art

A well-known oil or gas prospecting technique carries out seismic prospecting surveys of the subsoil. Geophysicists often use seismic reflection techniques to image the subsoil structure.

These techniques emit acoustic signals at the surface and record them after their successive reflections on the interfaces between geologic layers referred to as geologic discontinuities.

The accuracy of these seismic images of the subsoil obtained from seismic reflection surveys is of fundamental importance because it is from the analysis of the images that the geometry and the volume of the reservoirs, that, for example, the position and the geometry of new wells to be drilled, etc., are determined.

These imaging methods are based on the measurement of the traveltimes of the waves reflected on the main discontinuities of the subsoil. These traveltimes are the kinematic information that is used to determine the velocities of propagation of the seismic waves in the layers forming the subsoil. From these propagation velocities, the seismic records (measurements as a function of time) are converted to a depth image of the subsoil. This is referred to as time/depth conversion.

However, several representations of the subsoil velocities can explain the kinematics of seismic data. External information on the expected velocity representation is then necessary to remove the indeterminacy. This information can be data recorded in wells, but it must then be possible to determine the subsoil velocities while accounting for this type of information, in addition to the seismic information.

Determination of the subsoil velocity model is generally performed at the start of the petroleum exploration chain. This is carried out with little or no additional information. In fact, few wells have generally been drilled at this stage. Thus, quite often, the seismic subsoil image obtained in this context shows seismic reflectors that do not perfectly adjust with the seismic reflector depths recorded in wells.

A structural calibration of the seismic image with the well data is then essential prior to reservoir surveys. This calibration is then generally performed a posteriori. It updates the pre-existing velocity model. This velocity model modification is most often carried out via rudimentary methods that update the velocity model only locally, vertically to the well, without taking into account the possible wave propagation complexity in the case of horizontal plane non-homogeneous media or the wavelengths of the velocity variations contained in the initial velocity model.

Thus, the most commonly used method for adjusting a velocity model to the information recorded in wells produces, from the difference between the depth of a seismic marker observed in wells and that of the corresponding marker in a seismic depth image, a multiplicative or additive corrective coefficient that is applied to the velocity column located above the measuring point being considered and generally up to the depth of the previously calibrated upper seismic marker. If several wells are considered simultaneously, an interpolation between wells of the corrective values can be performed and the result is applied to the entire velocity model being considered. This technique is based on very strong medium simplifying hypotheses, poorly representative of the majority of the fields to be developed which the medium is made up of horizontal plane layers and the velocities do not vary much laterally. Because it is fast, easy to implement and/or for lack of other methods, this technique is however commonly used beyond its limited range of application. An erroneous image is then produced, which leads to erroneous interpretations and conclusions when characterizing a reservoir to define its conditions.

There is thus no satisfactory method in practice for using data newly acquired during the development of a reservoir, so as to acquire more precise knowledge of the underground geology and thus to provide a better evaluation of the reserves production modelling or development management.

SUMMARY OF THE INVENTION

The invention concerns an alternative method for defining the exploration and production conditions of a hydrocarbon reservoir for which an image of the structure thereof is known, and wherein this image is modified so as to integrate measurements recorded in wells.

The invention relates to a method for developing a hydrocarbon reservoir wherein a first seismic depth image representative of the structure of the reservoir is established with seismic data and a representation of the propagation velocities of seismic waves in the reservoir. A set of log data obtained from measurements taken in wells traversing the reservoir is then acquired. The method comprises the following:

measuring differences between seismic reflector depths observed in the first seismic depth image and depths of these reflectors identified in wells for which log data are available;

modifying the velocity representation to minimize differences by means of a prestack kinematic inversion technique;

constructing a second seismic depth image with the modified velocity representation; and using the second seismic depth image representative of the reservoir structure to determine development conditions for the hydrocarbon reservoir.

According to the invention, the velocity model can be modified by carrying out the following:

a) performing, from the first seismic image, a picking of seismic reflectors for which the difference is above a selected threshold;

b) determining prestack traveltimes for these reflectors which are picked, by prestack ray tracing;

c) modifying at a first time the velocity representation by means of a traveltime tomography with constraints wherein prestack traveltimes and log data are simultaneously used, the log data allowing defining of constraints on depths of the reflectors which are picked;

d) repeating c) until the modified velocity representation minimizes the depth differences.

According to an embodiment, a single first seismic reflector is picked in a), then b) to d) are applied to obtain a new velocity representation, then said differences between depths are measured again, a) to d) are repeated by picking a second seismic reflector, deeper than the first reflector, and finally these stages are repeated for each of the seismic reflectors for which the difference is above the threshold.

A weighting term greater than a weighting term assigned to the prestack traveltimes can be assigned to the log data.

BRIEF DESCRIPTION OF THE DRAWINGS

Other features and advantages of the method according to the invention will be clear from reading the description hereafter of non limitative embodiment examples, with reference to the accompanying figures wherein.

Like reference numerals identify like parts throughout.

DETAILED DESCRIPTION OF THE INVENTION

The method according to the invention relates to petroleum reservoir exploration and development. It allows acquiring realistic knowledge of the underground geology in order to efficiently provide evaluation of reserves, production modelling or development management. In fact, for determination of the location of a production well or of an injection well, the parameters required for optimum hydrocarbon recovery, such as injection pressure, drilling mud composition, completion characteristics, require good knowledge of the reservoir geometry.

Figure 1:
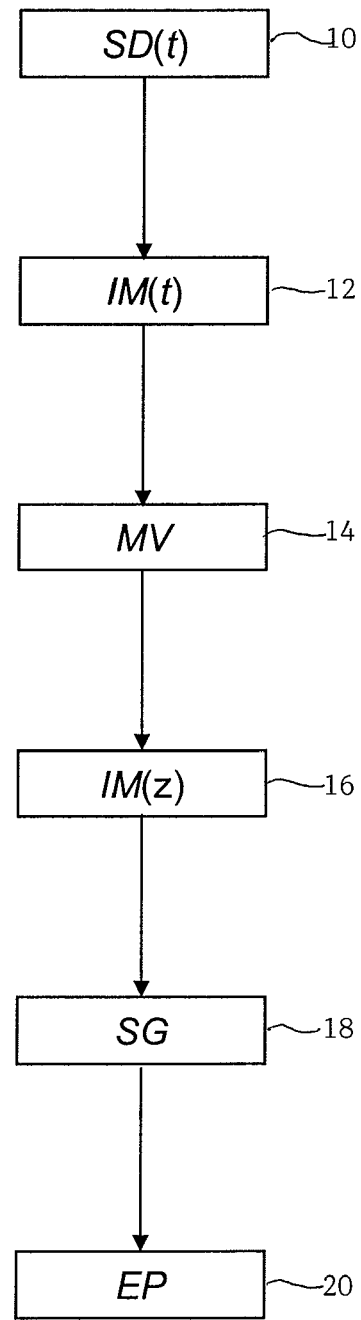
FIG. 1 is a diagram describing the defining of the exploration and production conditions for a reservoir from seismic data.

FIG. 1 illustrates the general principle of the method. Seismic time data SD(t) 10 from which an image of the subsoil IM(t) 12 is constructed are acquired. This image is a representation of the subsoil with a vertical time axis. The velocities are variable from one layer to the next, with the image being deformed in relation to reality. A velocity model MV 14 relative to the propagation of the waves in the subsoil is then determined. A depth image IM(z) 16 is constructed from this model and from the time image. This image is a realistic representation of the subsoil, similar to an ultrasound in the medical field. From this image, the geometry and the structure of the reservoir (SG) 18 are defined by specialists. They specifically deduce therefrom the exploration or production conditions (EP) 20 of the underground zone thus imaged.

Figure 2:
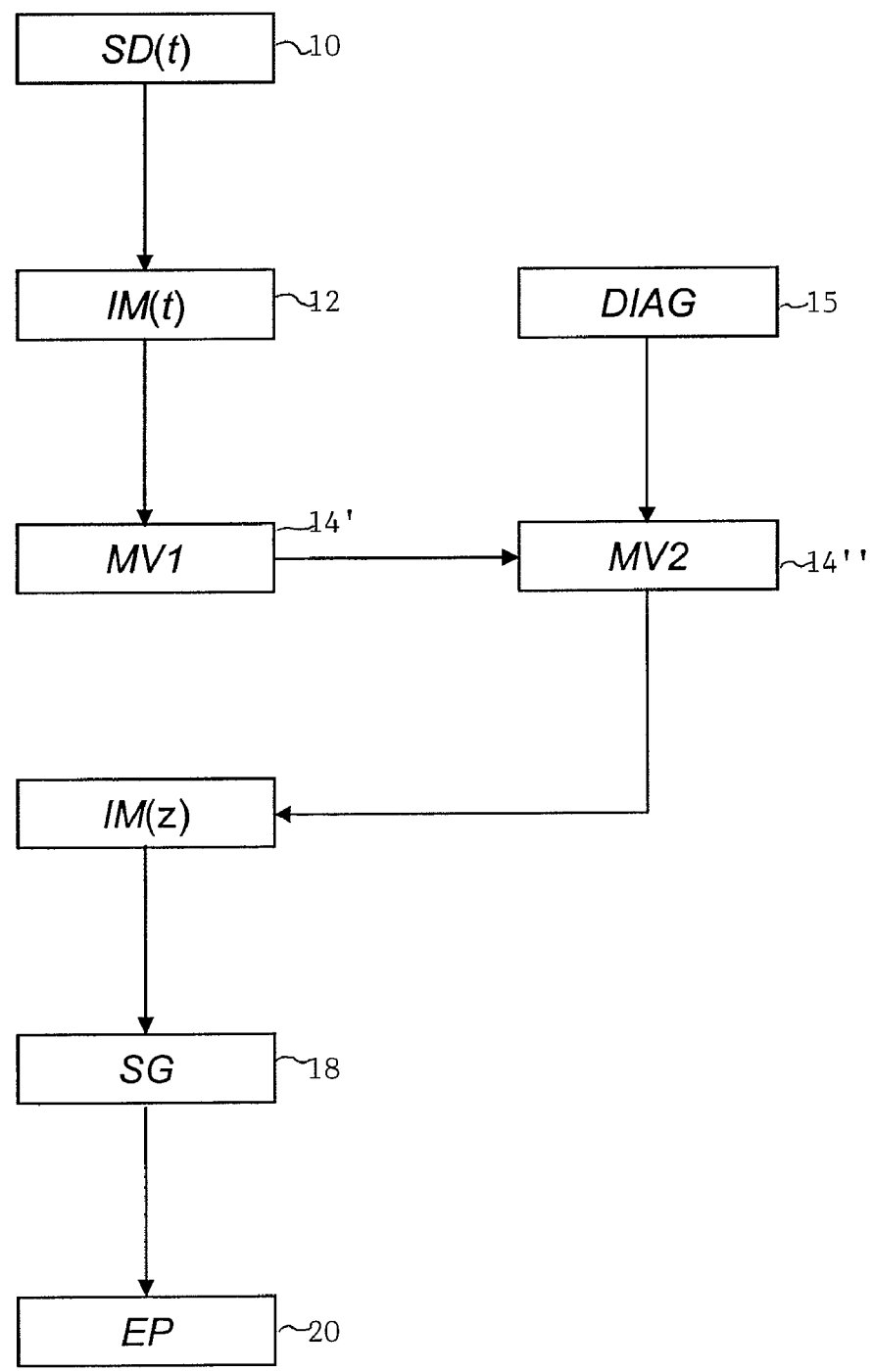
FIG. 2 is a diagram describing the steps of the invention.

The method according to the invention mainly comprises six steps (FIG. 2):

Acquisition 10 of seismic data SD(t) from an image of the subsoil IM(t) 12

Construction 12' of a velocity model MV1 14'

Acquisition 15 of logs DIAG

Modification 16 of the velocity model MV2 14"

Geometrical and structural characterization of the reservoir SG 18 using a depth image 16

Definition of the exploration or production conditions EP 20

Step 1: Acquisition of Seismic Data

The seismic reflection technique is implemented using a seismic acquisition device conventionally comprising seismic sources and receivers, as well as a seismic signal recording laboratory. The sources emit seismic waves that are propagated in the subsoil, and the set of seismic receivers coupled with the medium picks up the waves reflected by the subsoil discontinuities in response to the emitted waves. These subsoil discontinuities, which have the property of reflecting the seismic waves, are referred to as seismic reflectors. The seismic reflectors correspond to the major impedance contrasts of the subsoil. Finally, the laboratory recording the seismic signals picked up by the receivers provides multi-offset seismic records.

Generally, a computer in which the seismic data are stored and displayed as record sections is then used.

A record section is an object, an image that can be shown on a computer screen or on any other medium such as paper. Such a section represents an image of the subsoil in the same way as an ultrasound can represent the inside of the human body. In these seismic images, the seismic reflectors appear as more or less continuous lines.

According to an embodiment, the signal-to-noise ratio of the seismic images is increased so as to better see the major seismic reflectors. The method described in the following document can be used:

Yilmaz, O., 2001, Seismic Data Analysis—Processing, Inversion and Interpretation of Seismic Data: Society of Exploration Geophysicists.

Figure 4:
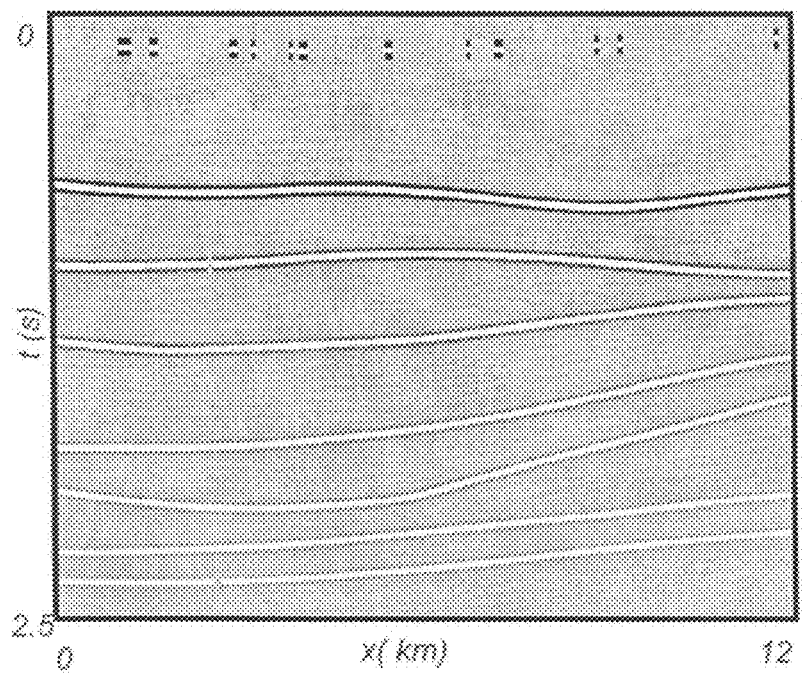
FIG. 4 illustrates synthetic seismic data from a velocity representation of FIG. 1.

However, the seismic image is constructed on the basis of seismic wave arrival times. Thus, the vertical scale of this image is in time (seconds). Such an image is illustrated in FIG. 4. The sedimentary layers or other geologic formations of the subsoil studied have different properties. This induces different propagation velocities for the seismic waves in the different media. The consequence is that the image which is obtained, that is referred to as seismic time image, is deformed in relation to reality.

It is therefore necessary to convert this image to an image whose vertical scale is in depth (meters) so as to be able to industrially exploit this image to evaluate the hydrocarbon reserve potential of a zone of the subsoil and/or to best develop this zone. It is then referred to as seismic depth image.

Knowing the wave propagation times, it is necessary to know the velocities of the various structures of the subsoil to deduce a depth image therefrom.

Step 2: Construction of an Initial Representation of the Subsoil Velocities 12

A representation of the subsoil velocities is constructed from the records of the seismic data acquired in the previous step. This representation is referred to as an "initial representation". There are various methods for determining a representation of the velocities of a subsoil. This type of method uses the traveltimes of the waves reflected on the main subsoil discontinuities. A technique, suited to the geological complexity of the formation being considered, is preferably selected among these techniques. Thus, for example in the case of media with great lateral velocity variations, a prestack kinematic inversion method such as prestack traveltime tomography can be used. The latter method works from the traveltimes of the waves extracted from the seismic records, and not from an approximation of this kinematic information. It allows finding the geometry of the associated reflectors and the velocities of the layers that make up the subsoil. The velocity representation which is obtained is then assumed to be a realistic velocity representation, or at least a representation representing the seismic data kinematics. A description of the various subsoil velocity determination techniques and of their limits can be found in:

Yilmaz, O., 2001, Seismic Data Analysis—Processing, Inversion and Interpretation of Seismic Data: Society of Exploration Geophysicists.

Step 3: Acquisition of Logs 14

Physical measurements within wells, referred to as "logs", are performed. These logs are obtained at regular intervals in wellbores, at least at one lateral position of the formation being studied, and over a depth allowing reaching at least one of the major seismic reflectors.

These logs allow identifying the major seismic reflectors of the subsoil which is located in the seismic image. It is well known that density logs and velocity (sonic) logs are used. Therefore, a combination of these two logs allows obtaining an impedance log. An impedance log shows the impedance variation in the formation along the well. This log is obtained in depth, which gives a series of values (x, y, z, I) and it can be converted to time, which gives a series of values (x, y, t, I), by means of a time/depth conversion using the velocity (sonic) logs or of a specific time-depth conversion law measurement referred to as check shot. The geographical coordinates of the well are represented by x and y. The depth is denoted by z, time t, and impedance I. A detailed description of logging methods can be found in:

Serra, O., Serra, L., Diagraphies, Acquisitions et Applications, 2001, Technip Ed.

Step 4: Modification of the Subsoil Velocity Representation 16

This step is also referred to as calibration.

a) Construction of a Depth Image of the Subsoil

The seismic reflectors which are observed in the records are replaced both vertically and laterally from the seismic time image and the initial subsoil velocity representation. This step can be carried out by means of a poststack depth migration. This technique is notably suited in the case of lateral velocity variations. Such a technique is for example described in:

Yilmaz, O., 2001, Seismic Data Analysis—Processing, Inversion and Interpretation of Seismic Data: Society of Exploration Geophysicists.

The depth image of the formation being studied, and in particular of the major seismic reflectors, assumed to represent reality, is thus obtained.

b) Calculation of the Error on the Depth Position of the Major Seismic Reflectors The difference between the depth of the major seismic reflectors, observed in the seismic depth image, and the depth, given for these reflectors, in the wells for which suitable logs are available, is measured. The time impedance log previously obtained is therefore used and convoluted with a wavelet simulating a seismic wave. A synthetic time seismic trace, also referred to as synthetic record, is thus obtained. This synthetic record is then superposed on the seismic image, either in time or in depth, after time-depth conversion using the velocity (sonic) logs or a specific time-depth conversion law measurement referred to as check shot. This superposition, in connection with the impedance log, then allows identifying to which impedance contrast along the well to which the seismic reflector visible in the seismic records corresponds.

More precisely, it is possible to know that such a seismic reflector visible in the seismic images is located at such lateral position and such depth.

c) Individualization of Some Seismic Reflectors

For the seismic reflectors for which there is a non zero difference, or a difference that is sufficiently great to require reprocessing, depending on the accuracy expected by the person conducting the drilling, a picking of the seismic reflectors is performed in the current seismic depth image.

A specialist and a dedicated interpretation software called interpretation station is used to pick the seismic reflectors. The picking of seismic reflectors locates in the seismic image continuous lines in the seismic image and individualizes the continuous lines by selecting points therein. The interpretation station records the coordinates of each selected point and forms a continuous line.

d) Determination of the Prestack Traveltimes

Prestack ray tracing is performed on picked reflectors by using the velocity representation the representation used for the poststack depth migration.

The obtained zero-offset traveltimes are therefore independent of the velocity used for the migration and ray tracing stages. The traveltimes obtained for the non zero offsets will, on the other hand, depend on the velocity model used. A description of the ray tracing principle can be found in:

Jurado, F., Lay, P., and Ehinger, A., (1998), "Fast 3D Two-Point Raytracing for Traveltime Tomography", Proceedings of SPIE, Mathematical Methods in Geophysical Imaging V, 3453, 70-81.

e) Updating the Velocities by Prestack Kinematic Inversion

According to the invention, the subsoil velocity representation is updated by means of a prestack kinematic inversion technique.

An example of such a method is the prestack traveltime tomography. A description of this technique can be found in the following document:

Bishop, T. et al, 1985, "Tomographic Determination of Velocity and Depth in Laterally Varying Media" Geophysics, 50 N°6, 903-923.

A kinematic inversion is an iterative inverse method that modifies stepwise the subsoil velocity representation until the traveltimes calculated in the current representation, by prestack ray tracing for example, are in accordance with the traveltimes provided at the input. This technique of determining the velocity representation requires no approximation of the subsoil complexity.

According to the invention, a kinematic inversion algorithm with constraints is used. This algorithm uses an optimization engine that can solve non-linear optimization problems with constraints. An example of such a method is the traveltime tomography with constraints. A description of such a method can be found in the following Ph.D. manuscript:

Delbos, F. (2004), "Problèmes D'optimisatio Non Linéaire Avec Contraintes en Tomographie de Réflexion 3D", Ph.D. Université Pierre et Marie Curie (Paris VI).

The input data of this inversion are the major seismic reflectors and the prestack traveltimes from the previous step d).

The well data on the selected reflectors are also introduced in the prestack kinematic inversion algorithm as constraints to be imposed on the velocity model. The well information is expressed by linear equality and/or inequality constraints. In cases where the position of a seismic reflector in a well is precisely known, an equality constraint is used. In the opposite case, if the position of a seismic reflector is subject to uncertainties, an inequality constraint is used. It defines, between a lower boundary and an upper boundary, the vertical position variations allowed for this reflector.

Prestack kinematic inversion iterations with constraints are then carried out, using simultaneously the double information, seismic and well information, for the selected seismic reflectors. In case of a great gap between the kinematic information and the well information (which would mean that the initial velocity representation does not significantly respect the seismic data kinematics), it is then advisable to favor the well information during the iterative process. The weighting term assigned to the well data is then stronger than the term assigned to the kinematic data.

According to an advantageous embodiment, all of these steps can be applied to all seismic reflectors after the chosen reflector, from the shallowest to the deepest one. Once the adjustment is achieved for a given reflector, the propagation velocity model thus obtained is fixed before switching to the reflector associated with increasing depths.

Some seismic reflectors may also not immediately exhibit well calibration errors. In this case, the velocity model associated with these reflectors is fixed for inversion of the lower reflectors (in most cases the velocities above the considered reflector).

In the selected sequential approach, the adjustment of a given reflector may also cause bad calibration for a reflector located at a greater depth and whose calibration was good in an earlier stage. In this case, the method also has to be applied for this reflector.

Step 5: Geometrical and Structural Characterization of the Reservoir 18

This step constructs an image of the subsoil whose vertical scale is in depth, from the seismic image acquired in time.

From the seismic time image and from the new subsoil velocity representation, the seismic markers observed in the records are replaced both vertically and laterally. This step can be carried out by means of a poststack depth migration.

Step 6: Definitions of the Production and Plant Dimensioning Conditions 20

From this depth image, perfectly calibrated with all the available data, notably those measured in wells, the reservoir engineer can efficiently provide an evaluation of reserves, production modelling or development management. In fact, determining the location of a production well or of an injection well, the parameters required for optimum hydrocarbon recovery, such as injection pressure, drilling mud composition, completion characteristics, require good knowledge of the geometry and the structure of the reservoir.

For example, precise determination of the geological depth interfaces allows determining the probable location of the hydrocarbons in the subsoil when they, for example, are trapped in structural traps. On the other hand, it is possible to determine a probable volume of recoverable hydrocarbons. The specialist can then determine whether the reservoir is economically exploitable. If it is, he or she can determine the location of future exploration and production wells to optimize the recovery of hydrocarbons in place.

Application Example

An example of application to a synthetic case is described in order to better understand the way the method operates.

Figure 3:
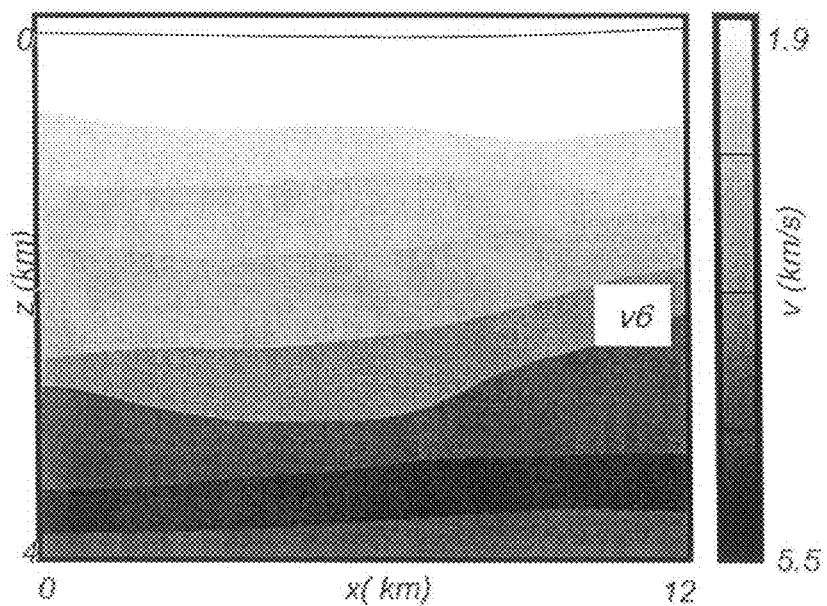
FIG. 3 shows a synthetic velocity representation model for a subsoil of nine layers.

FIG. 3 shows a set of synthetic data on which the method is tested. It shows a depth section (z) of a subsoil of nine sedimentary layers. The horizontal axis represents a subhorizontal geographical direction (x). The velocity of propagation of the seismic waves in these layers is constant. These velocities (V) vary however from one layer to the next, ranging between 1.9 and 5.5 km/s. The sixth layer on which the tests are more precisely performed is characterized by a velocity $V_6$ of 4.2 km/s.

FIG. 4 shows the seismic data that could be obtained by performing a seismic acquisition in the medium of FIG. 3. Such an image is obtained by means of a seismic modelling algorithm from the velocity model of FIG. 3.

We consider now that we have, as in reality, only the seismic data available (FIG. 4). The goal is then to obtain a subsoil image that is as close as possible to reality, i.e. close to FIG. 3.

Figure 5:
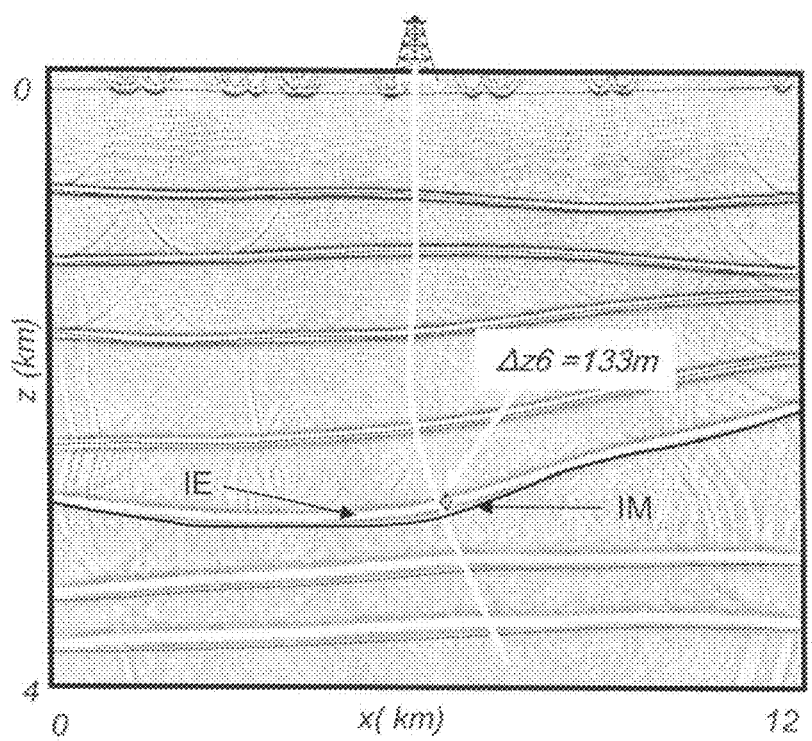
FIG. 5 shows depth conversion of seismic data shown in FIG. 2 with the erroneous model shown in FIG. 3, superposed on exact velocity model interfaces of FIG. 1.

In accordance with the steps 10-20 of FIG. 1, a velocity model is determined. It is assumed that this model comprises a 10% error on the velocity of the sixth layer. The new velocity of this layer, denoted by $V_6'$, is 3.8 km/s. The result of the poststack depth migration of the seismic data, using the erroneous model, is shown in FIG. 5. The interfaces of the exact velocity model, known within the context of this experiment on synthetic data, are represented by black lines in FIGS. 5 and 6. They are superposed on the poststack depth migrated image in which the interfaces form thick white lines. At the level of the well, whose position is shown in the same figure, a difference of 133 m ($\Delta z$) is observed between the interface of the migrated image (IM) and the expected exact depth of this interface (IE), marking the base of the sixth layer.

The context of this experiment on synthetic data also allows observing that, in general terms, the error on the velocity of the sixth layer generates a bad calibration for interface 6 in general, not only in the well, but also for interfaces 7 and 8 located below layer 6.

Figure 6:
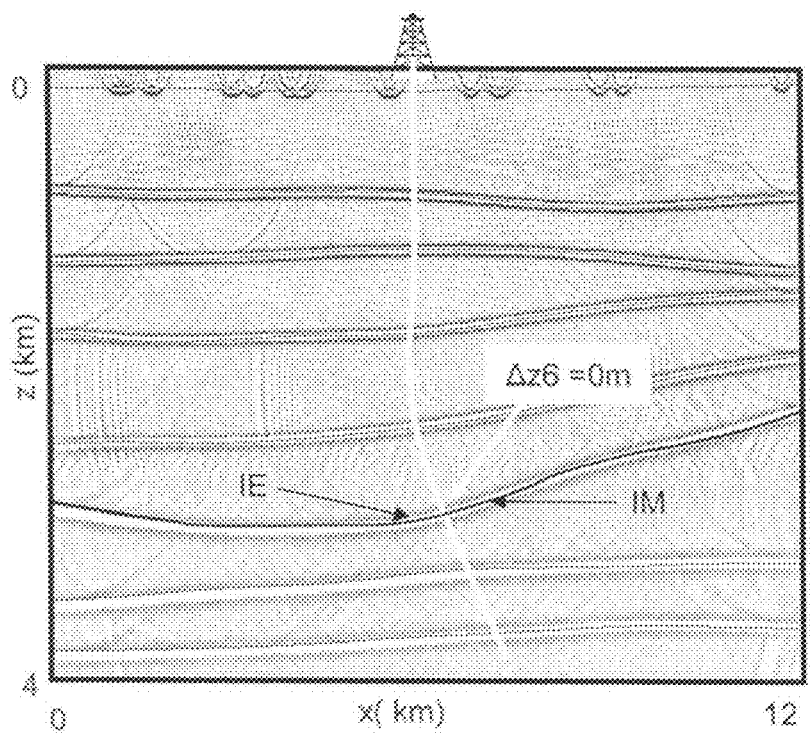
FIG. 6 shows depth conversion of seismic data shown in FIG. 2 with the velocity model adjusted according to the invention.

The method according to the invention is now applied. The erroneous velocity model is adjusted according to information recorded in wells. Velocity $V_6'$ has thus been updated by means of the method of the invention, by introducing a constraint on the position of the central well. The velocity of the sixth layer, denoted by $V_6''$, is relatively close to velocity $V_6$ of the exact model. The result of the poststack depth migration obtained with the propagation model adjusted by the method is shown in FIG. 6. The interfaces of the exact model, known in the context of this study on synthetic data, are superposed on the result of the migration for information. It is observed that the adjustment of the velocity in the sixth layer by the method of the invention obtains a poststack migrated depth image in accordance with the central well.

The context of this experiment on synthetic data also allows observing that, in general, adjustment of the velocity of the sixth layer in general provides better calibration for interface 6, not only in the well, but also for interfaces 7 and 8 located below layer 6.

The invention thus allows converting a seismic time image to a depth image of the subsoil taking account of all the available measurements. In fact, this method allows adjustment of an already existing seismic wave velocity model so as to be in accordance with information recorded in wells, such as the depth of the main seismic reflectors. This technique is particularly suitable in the case of underground media with lateral velocity variations.

The invention thus provides a depth image that is industrially exploitable for evaluating the hydrocarbon reserve potential of a zone of the subsoil and/or for best developing this zone.

The invention claimed is:

1. A method for developing a reservoir wherein a first seismic depth image representative of structure of the reservoir is obtained from seismic data and of a representation of the propagation velocities of seismic waves in the reservoir and a set of log data obtained from measurements taken in wells traversing the reservoir is acquired, comprising:
   measuring differences between depths of seismic reflectors observed in the first seismic depth image and depths of reflectors identified in wells for which log data are available;
   modifying the representation of propagation velocities to minimize the differences using a prestack kinematic inversion;
   constructing a second seismic depth image representation of structure of the reservoir using the modified velocity representation; and
   using the second seismic depth image representative of the structure of the reservoir to determine development conditions for the reservoir, evaluation of the reservoir or production modeling; and wherein
   the representation of the propagation velocities is modified by:
   a) performing, from the first seismic image, a picking of seismic reflectors for which differences are above a selected threshold;
   b) determining prestack traveltimes for the picked reflectors by prestack ray tracing;
   c) modifying the representation of the propagation velocities using traveltime tomography with constraints wherein the prestack traveltimes and the log data are simultaneously used with the log data to define constraints on depths of the picked reflectors; and
   d) repeating c) until the representation of the propagation velocities which are modified minimizes differences between depths of the seismic reflectors.

2. A method as claimed in claim 1, wherein:
   a single first seismic reflector is picked in a);
   then b) to d) are applied to obtain a new representation of the velocity;
   then the differences between depths are measured again;
   a) to d) are repeated by picking a second seismic reflector, deeper than the first reflector; and
   a) to d) is repeated for each of the seismic reflectors for which the difference is above the threshold.

3. A method as claimed in claim 1, wherein a weighting term, greater than a weighting term which is assigned to the prestack traveltimes, is assigned to the log data.

4. A method as claimed in claim 2, wherein a weighting term, greater than a weighting term which is assigned to the prestack traveltimes, is assigned to the log data.

5. A method in accordance with claim 1 wherein:
the second seismic depth image representative of the structure of the reservoir is used to determine development conditions of the reservoir.

6. A method in accordance with claim 1 wherein:
the second seismic depth image representative of the structure of the reservoir is used to determine evaluation of reserves.

7. A method in accordance with claim 1 wherein:
the second seismic depth image representative of the structure of the reservoir is used to determine production modelling.

8. A method in accordance with claim 2 wherein:
the second seismic depth image representative of the structure of the reservoir is used to determine development conditions of the reservoir.

9. A method in accordance with claim 2 wherein:
the second seismic depth image representative of the structure of the reservoir is used to determine evaluation of reserves.

10. A method in accordance with claim 2 wherein:
the second seismic depth image representative of the structure of the reservoir is used to determine production modelling.

11. A method in accordance with claim 3 wherein:
the second seismic depth image representative of the structure of the reservoir is used to determine development conditions of the reservoir.

12. A method in accordance with claim 3 wherein:
the second seismic depth image representative of the structure of the reservoir is used to determine evaluation of reserves.

13. A method in accordance with claim 3 wherein:
the second seismic depth image representative of the structure of the reservoir is used to determine production modelling.

14. A method in accordance with claim 4 wherein:
the second seismic depth image representative of the structure of the reservoir is used to determine development conditions of the reservoir.

15. A method in accordance with claim 4 wherein:
the second seismic depth image representative of the structure of the reservoir is used to determine evaluation of reserves.

16. A method in accordance with claim 4 wherein:
the second seismic depth image representative of the structure of the reservoir is used to determine production modelling.

* * * * *